(12) United States Patent
Steurer et al.

(10) Patent No.: US 12,415,399 B2
(45) Date of Patent: Sep. 16, 2025

(54) METHOD OF OPERATING A COOLING SYSTEM

(71) Applicant: MAHLE INTERNATIONAL GMBH, Stuttgart (DE)

(72) Inventors: Hans-Ulrich Steurer, Stuttgart (DE); Sascha Lindauer, Schorndorf (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 325 days.

(21) Appl. No.: 18/141,081

(22) Filed: Apr. 28, 2023

(65) Prior Publication Data

US 2023/0347708 A1  Nov. 2, 2023

(30) Foreign Application Priority Data

May 2, 2022  (DE) .......................... 102022110716.7

(51) Int. Cl.
 *B60H 1/00* (2006.01)
(52) U.S. Cl.
 CPC ..... *B60H 1/00392* (2013.01); *B60H 1/00278* (2013.01); *B60H 1/00828* (2013.01)
(58) Field of Classification Search
 CPC ............ B60H 1/00392; B60H 1/00278; B60H 1/00828; B60H 1/00885; B60H 1/32284;
 (Continued)

(56) References Cited

U.S. PATENT DOCUMENTS

2015/0273976 A1  10/2015 Enomoto

FOREIGN PATENT DOCUMENTS

CN  102548780 A  *  7/2012  ............. B60H 1/004
CN  108790681 A  *  11/2018  ......... B60H 1/00278
(Continued)

OTHER PUBLICATIONS

Search Report issued in German Application No. 102022110716.7, dated Aug. 20, 2024, 7 pages.

*Primary Examiner* — Kun Kai Ma
(74) *Attorney, Agent, or Firm* — Barnes & Thornburg LLP (57) ABSTRACT

An operating method for operating a cooling system for a motor vehicle, in particular for an electrically powered motor vehicle, wherein the cooling system has a first cooling circuit, a second cooling circuit, and at least one coolant circuit;
 wherein the first cooling circuit has at least one first component to be temperature-controlled and an indirect condenser, which are arranged in two sections extending parallel to one another, with a first switching point which is arranged on the first or second branching point and which controls the inflow of a cooling medium into the first component to be temperature-controlled and the indirect condenser;
 wherein the second cooling circuit has at least one second component to be temperature-controlled and a chiller;
 wherein the first and second cooling circuits can be connected by means of a first and second connecting section, and a second switching point, which controls the inflow of the cooling medium into at least the first connecting section, is arranged at least on the first connecting section;
 wherein a third switching point, which controls the inflow of cooling medium into the chiller, is arranged in the second cooling circuit;
 wherein, in the first cooling circuit, a radiator is arranged downstream of the second connecting section, and a fourth switching point, which controls the inflow of
 (Continued)

cooling medium into the radiator, is arranged upstream of the radiator, characterized in that the first, second, third, and fourth switching point are controlled at least as a function of an ambient temperature Tu.

19 Claims, 3 Drawing Sheets

(58) Field of Classification Search
CPC ... B60H 1/323; B60H 1/00385; B60H 1/00642; B60H 1/3227
See application file for complete search history.

(56) References Cited

FOREIGN PATENT DOCUMENTS

| | | | | | |
|---|---|---|---|---|---|
| CN | 109895599 | A | * | 6/2019 | |
| CN | 112140829 | A | * | 12/2020 | ......... B60H 1/00321 |
| CN | 109050201 | B | * | 9/2021 | ......... B60H 1/00007 |
| DE | 10300294 | A1 | | 7/2003 | |
| DE | 102012108043 | A1 | | 5/2014 | |
| DE | 112013003104 | T5 | | 3/2015 | |
| DE | 102019207993 | A1 | | 12/2019 | |
| JP | 2008308080 | A | * | 12/2008 | ......... B60H 1/00921 |
| JP | 2009052782 | A | * | 3/2009 | |
| KR | 20220050560 | A | * | 4/2022 | |

* cited by examiner

METHOD OF OPERATING A COOLING SYSTEM

CROSS-REFERENCE TO RELATED APPLICATIONS

This application claims priority from German Patent application number DE 102022110716.7, filed on May 2, 2022, the entirety of which is hereby fully incorporated herein by reference.

The invention relates to a method for operating a cooling system for a motor vehicle according to the preamble of the independent claim.

A cooling system is known from DE 103 00 294 A1, having a first cooling circuit for dissipating heat from a first heat source, e.g. an electric motor, a transmission heat exchanger, or an electronic cooling plate. Furthermore, the cooling system has a second cooling circuit, which includes a second heat source, such as an internal combustion engine. A heater core is used to heat the passenger compartment. The first and second cooling circuits and the heater core can be selectively connected to one another with valve means. Some possible operating methods are presented by which the cooling system can be operated.

The method according to the invention for operating a cooling system for a motor vehicle with the features of the independent claims has the advantage that two cooling circuits can not only be coupled directly to one another, but also heat or cold can be distributed and used as needed in the vehicle by connecting both cooling circuits to a coolant circuit via a chiller and an indirect condenser. This enables flexible management of heating and cooling of drive components and the passenger compartment of an electrically powered motor vehicle that keeps energy consumption for heating and cooling low in order to use the amount of energy stored in the vehicle for the drive as much as possible. A large part of the relevant driving and operating states of a motor vehicle, in particular a battery-powered motor vehicle, are covered in various possible operating methods.

Therefore, in the present case, methods for operating a cooling system for a motor vehicle are proposed, in particular for an electrically driven motor vehicle, according to the features of claim 1 and the dependent claims.

The cooling system according to the invention for a motor vehicle, which is necessary for the operation of the operating method according to the invention, has a first cooling circuit and a second cooling circuit and at least one coolant circuit. The two cooling circuits are operated with the same cooling medium, which is usually water mixed with glycol. However, it is also conceivable to use other cooling media, such as low-viscosity oils or media specially tailored to the application. The coolant circuit is operated with a suitable coolant that can provide the necessary properties for absorbing, transferring, and releasing heat in a coolant circuit.

The first cooling circuit contains, for example, at least one first coolant pump, which can convey the cooling medium in a suitable manner in the cooling circuit. The first cooling circuit also contains at least one component to be temperature-controlled, which can be an electric drive motor in an especially inventive embodiment. It is also conceivable that further components to be temperature-controlled are arranged in the first cooling circuit, such as an inverter for generating the alternating current for the electric drive motor, but also other electrical power circuits that can give off heat during operation or when charging a motor vehicle or that must first be heated under certain ambient conditions so that the components enter an optimal operating mode.

A heat exchanger designed as a radiator is also arranged in the first cooling circuit for transferring heat between the first cooling circuit and the ambient air. Cooling medium, which can exchange heat with the ambient air, can thus pass through the radiator. For an improved heat exchange between the radiator and the ambient air, a fan can be arranged on the radiator, which blows or extracts ambient air over the radiator. The dynamic pressure that occurs when the vehicle is moving, which is also known as the headwind, also supports the heat exchange. A heat exchanger designed as an indirect condenser is also arranged in the first cooling circuit. The indirect condenser transfers heat between the first cooling circuit and a coolant circuit. An indirect condenser refers to when cooling medium that circulates in a cooling circuit is used for heat transfer in the condenser. In contrast to this are direct condensers, in which it is not cooling medium circulating in a cooling circuit but ambient air that is used for the heat exchange.

The at least one first component to be temperature-controlled and the indirect condenser are arranged in two sections extending parallel to one another, wherein the sections are divided at a first branching point and brought together at a second branching point. A first switching point is arranged either at the first or second branching point in this case. The first switching point is designed in such a way that a cooling medium circulating in the first cooling circuit can be divided between the two sections. Depending on the required application, a cooling medium can hereby be conducted more so into the at least first component to be temperature-controlled or into the indirect condenser. More cooling medium in the component to be temperature-controlled increases the cooling capacity there. On the other hand, the coolant circuit connected to the indirect condenser is influenced by the regulation of the coolant flow in the indirect condenser. More cooling capacity for the indirect condenser increases the performance and efficiency of the evaporator, for example, and can therefore provide more cold for the temperature control of the passenger compartment. However, other components of the coolant circuit such as the chiller and a heat pump heater can also be advantageously influenced in this way.

The distribution of the cooling medium can be made possible in particular by a suitable switchable or controllable valve device. It is also conceivable that two switching points, each arranged in one section, can undertake the division of the volume flow. For this purpose, the corresponding valve devices provided at the switching points must be controllable.

The second cooling circuit contains, for example, at least one second coolant pump, which can convey the cooling medium in a suitable manner in the cooling circuit. Like the first cooling circuit, the second cooling circuit contains at least one first component to be temperature-controlled. In a preferred manner according to the invention, this is a battery for storing the electrical energy for driving the motor vehicle. High demands for temperature control are placed on the battery, since this also has a major impact on the efficiency of the motor vehicle. Thus, the temperature of the battery must not be too low, but it also must not exceed certain limit temperatures even with high outside temperatures and a great power output. An ideal operating range for the battery is between 35° C. and 45° C. However, further components to be temperature-controlled can also be arranged in this cooling circuit, such as an electronic unit for controlling driver assistance systems and/or other electronic components.

A heat exchanger designed as a chiller, which is arranged in the second cooling circuit, transfers heat between the second cooling circuit and the coolant circuit.

The first cooling circuit and the second cooling circuit can be connected by means of a first connecting section and a second connecting section. A second switching point is preferably arranged in the first connecting section. This second switching point makes it possible to connect the first connecting section in such a way that a cooling medium circulating in the first cooling circuit flows through the first connecting section completely or at least partially. It would also be conceivable to arrange the second switching point in the second connecting section so that the inflow of cooling medium into the second cooling circuit is controlled there. The second switching point can open or close the inflow completely or only partially. However, the inflow of the second switching point is advantageously either open or closed in order to connect or separate the two cooling circuits. Closed here means that the flow of cooling medium is largely prevented by a suitable valve device, wherein a small leakage of up to 5% of the volume flow cannot be excluded or can be tolerated. This applies to all switching points used in the cooling system.

The first connecting section is arranged downstream of the at least first component to be temperature-controlled in the first cooling circuit, and the second connecting section is arranged downstream of the first connecting section. The two connecting sections can be connected to one another with a third connecting section, wherein the third connecting section has a check valve. The check valve allows flow through the third connecting section in only one direction and blocks flow in the other direction. If the two cooling circuits are separated, the cooling medium in the second cooling circuit circulates through this third connecting section. When the cooling circuits are connected, the check valve routes the cooling medium in the desired direction, so that it cannot immediately bypass the second cooling circuit again through the third connecting section, since the flow path here would have a lower flow resistance.

The radiator arranged in the first cooling circuit is preferably arranged downstream of the second connecting section. In this case, a third section of the first cooling circuit, in which a fourth switching point is arranged, is located downstream of the second connecting section and upstream of the radiator. This fourth switching point can connect the third section to the area upstream of the first branching point, at least partially bypassing the radiator, in such a way that a cooling medium circulating in the first cooling circuit flows entirely or at least partially through the first bypass section.

This allows the flow through the radiator to be controlled and the radiator to be switched off depending on the application, e.g., to heat the cooling circuit to a certain temperature or to partially or completely integrate the radiator to enable a high cooling effect through the ambient air.

In the second cooling circuit, a third switching point is arranged upstream of the chiller, which switching point connects a second bypass section while at least partially bypassing the chiller in such a way that a cooling medium circulating in the second cooling circuit flows through the second bypass section completely or at least partially.

The flow of cooling medium through the chiller can thus be controlled and the heat transfer between the second cooling circuit and the coolant circuit can thus be regulated.

The chiller usually absorbs heat from the cooling circuit by evaporating the coolant. The cooling circuit can thus be cooled in a targeted manner depending on the ambient and operating conditions, which is particularly advantageous for cooling the at least second component to be temperature-controlled, e.g. the battery. It is also conceivable that, in colder ambient conditions, heat is transferred to the coolant circuit by the heat absorption from the second cooling circuit or the first and second cooling circuits, which heat can then be used to heat the passenger compartment by means of a heat pump heater.

The coolant circuit used in the cooling system includes, for example, at least one compressor that can appropriately compress the coolant. The compressor is preferably designed as an electrically driven compressor.

In addition, at least one heat exchanger designed as an evaporator is arranged in the coolant circuit, which heat exchanger can exchange heat between the coolant circuit and the air flowing into the passenger compartment. In particular, the air flowing into the passenger compartment can be cooled by evaporating coolant, thus enabling temperature control of the passenger compartment at high outside temperatures. The evaporator can also be operated in what is known as a reheat mode, in which the air is cooled when there is high humidity in the ambient air and is then warmed up again by a heating device. This prevents the vehicle windows from fogging up.

The indirect condenser, which is already arranged in the first cooling circuit and has already been described, is also part of the coolant circuit and thus enables the heat exchange between the first cooling circuit and the coolant circuit.

The chiller, which is already arranged in the second cooling circuit and has already been described, is also part of the coolant circuit and thus enables the heat exchange between the second cooling circuit and the coolant circuit.

An internal heat exchanger used for the internal transfer of heat can also be arranged in the coolant circuit. It is used to transfer heat from different areas of the coolant circuit and can thus advantageously increase the efficiency of the coolant circuit.

A heat exchanger designed as a heat pump heater can also be arranged in the coolant circuit, which heat exchanger enables heat exchange between the coolant circuit and the air flowing into the passenger compartment. This heat pump heater makes it possible, in particular, to heat the air flowing into the passenger compartment by condensing the coolant in the heat exchanger.

The individual components in the first and second cooling circuit are connected to one another by suitable pipelines and/or hoses. It is also conceivable that individual components are combined in a liquid management module. For example, the pumps, valve devices, connecting sections, sensors, but also heat exchangers such as the chiller can be arranged on such a liquid management module. Individual fluid lines and guides can also be advantageously integrated in such a liquid management module. The components used for control and switching, in order to implement the various switching points, can also be represented as switchable individual valves, as complex valve devices that can map multiple switching positions in a valve body, or in another suitable manner.

The components to be temperature-controlled in the two cooling circuits can also be arranged in series or parallel to one another. Additional switching points can also be present in order, for example, to disconnect individual components to be temperature-controlled from the cooling circuit or even to control the inflow of cooling medium to an individual component to be temperature-controlled.

The heat exchangers arranged in the cooling circuits and coolant circuit can be structurally constructed in a wide variety of ways. For example, the heat exchangers can be constructed from individual pipes, wherein ribs can be arranged between the pipes in order, for example, to transfer heat to the air flowing through the ribs or to absorb heat from the air. Heat exchangers in a stacked design, in which individual plates are stacked alternately on top of one another and flow channels are thus created for at least two fluids, can also be used, in particular for the indirect condenser and the chiller. These are all known constructions and must be selected and designed appropriately for the required application.

For the corresponding control and regulation of the switching points, sensors such as pressure or temperature sensors and control units are required, which receive the necessary sensor signals and transmit corresponding control signals to the individual components, in particular switching points, in particular the switchable or controllable valves.

A cooling system designed in this way can be operated in different advantageous operating methods according to the invention, which are proposed in the features of claim 1 and the dependent claims.

The various operating methods are largely dependent on the ambient conditions, in particular the ambient temperature $T_U$ and/or the condition of the vehicle, for example the temperatures $T_1$, $T_2$ of the components to be temperature-controlled. The temperature $T_1$ of the first component P1 to be temperature-controlled is the temperature of the coolant at the entry into the first component P1 to be temperature-controlled or, if present, at the entry into a further third component P3 to be temperature-controlled, which is present upstream.

The temperature $T_2$ of the second component P2 to be temperature-controlled is the maximum material temperature occurring in the second component P2 to be temperature-controlled. In the preferred embodiment according to the invention, it is the maximum cell temperature of the battery.

A first operating method includes starting the motor vehicle at very cold ambient temperatures TU of less than −5° C. to less than −20° C. It is assumed here that the second component to be temperature-controlled is a battery for driving the vehicle and that it is also still very cold and has assumed a temperature $T_2$ close to or equal to the ambient temperature $T_U$, in particular less than −5° C. The aim of this operating method is to get the battery and other components of the vehicle to a higher temperature level as quickly as possible. Heating the passenger compartment with heat from the cooling system is not a priority. At the first switching point, the volume flow is controlled in such a way that no cooling medium or a maximum of 5% of the cooling medium circulating in the first cooling circuit flows via the indirect condenser. The cooling medium thus primarily flows through the first component to be temperature-controlled. In this case, it is assumed that this is an electric drive motor with corresponding power electronics. Heat is absorbed by the drive motor in this process. In this operating method, the second switching point is set in such a way that the first connecting section is completely or almost completely open. The second cooling circuit is thus coupled to the second cooling circuit. This allows the heat absorbed by the drive motor to be used to heat the battery in the second cooling circuit. The third switching point in the second cooling circuit is switched in such a way that the flow through the chiller is very low or not present at all, in particular with less than 5% volume flow, and the relevant part of the circulating volume flow is routed via the second bypass section. The fourth switching point is switched in such a way that the radiator is bypassed and thus no cooling medium or only a very small proportion of less than 5% of the cooling medium volume flow is cooled by the ambient air and routed past the radiator via the first bypass section. The heat of the cooling medium is thus distributed in the two cooling circuits and, in particular, discharged to the battery.

A second operating method in turn covers very cold ambient temperatures $T_U$ of less than −5° C., in particular down to −20° C. The temperature $T_2$ in the second component to be temperature-controlled, preferably the battery, has already assumed a temperature of greater than −5° C. but still less than 10° C. The motor vehicle has therefore already been in operation for a certain time and the battery has absorbed or generated some heat. It is also conceivable that the battery was already warmed up from a previous trip or a charging process. However, the battery is still too cold for optimal operation, which requires a temperature $T_2$ between 35° C. and 45° C. The first component to be temperature-controlled, preferably the electric drive motor with power electronics, continues to heat the two cooling circuits. The two cooling circuits are therefore still connected to each other; the radiator is switched off by bypassing it. There is likewise no flow through the condenser. The chiller can absorb up to 30% of the volume flow, in particular between 5% and 30%, and thus discharge part of the heat to the coolant circuit. In the coolant circuit, the heat introduced via the heat pump heater can thus be used to warm up the air flowing into the passenger compartment. In this case, the first switching point will close the flow to the condenser, so that a maximum of 5% of the volume flow will still pass through. The second switching point will be completely or almost completely open, and the third switching point controls the flow to the chiller in such a way that up to 30%, in particular at least 5% and at most 30%, of the volume flow is routed through the chiller. The fourth switching point closes the flow to the radiator so that a maximum of 5% of the volume flow can still pass through.

In a further operating method, the operation of the motor vehicle at ambient temperatures below 10° C. is covered. The temperature $T_2$ in the second component to be temperature-controlled, preferably the battery, is in an ideal range of from 35° C. to 45° C. The two cooling circuits are then no longer connected to each other; the radiator is switched off by bypassing it. There is likewise no flow through the condenser. However, the chiller can absorb between 50% and 100% of the volume flow and thus transfer part of the heat to the coolant circuit. The battery is thus cooled via the chiller, and heat is discharged to the coolant circuit, which heat can be used to heat up the passenger compartment. The drive motor and the power electronics heat up the first cooling circuit. The permissible temperatures for these components to be temperature-controlled are between 50° C. and 70° C. so that there is no increased cooling requirement for the components until the lower limit temperature of 50° C. is reached. The radiator accordingly remains disconnected.

In a further operating method, the operation of the motor vehicle at ambient temperatures below 10° C. is covered. The temperature $T_2$ in the second component to be temperature-controlled, preferably the battery, is in an ideal range of from 35° C. to 45° C. The temperature $T_1$ in the first component to be temperature-controlled, preferably the electric drive motor and/or power electronics, is above 50° C. The battery is in an optimal operating mode and is cooled via the chiller by discharging heat to the coolant circuit. The discharged heat can in turn be used to heat the passenger compartment. The first and second cooling circuits are separate from each other. The electric drive motor and the power electronics must then be cooled to prevent overheating. The radiator is then integrated into the first cooling circuit in order to enable cooling by the ambient air. If the waste heat from the coolant circuit exceeds the heating requirements of the passenger compartment, part of the volume flow is also routed via the condenser. In this case, the condenser discharges excess heat from the coolant circuit, which is used to cool the battery using the chiller. Thus, the first switching point controls the flow in such a way that up to 25%, in particular more than 5% and less than 25%, of the volume flow reaches the condenser, and the second switching point closes completely or almost completely; and the third switching point controls the flow to the chiller in such a way that between 50% and 100% of the volume flow is routed through the chiller; and the fourth switching point controls the flow to the radiator in such a way that up to 30%, in particular more than 5% and less than 30%, of the volume flow flows through the radiator.

In a further operating method, the operation of the motor vehicle at ambient temperatures between −5° C. and ° C. is covered. The temperature $T_2$ in the second component to be temperature-controlled, preferably the battery, is in a range of from −5° C. to 10° C. The first and second cooling circuits are connected to each other. The chiller transfers part of the heat to the coolant circuit and thus provides heat for heating the passenger compartment via a heat pump heater. There is no flow through the radiator, which means that the heat discharged in the second component to be temperature-controlled is used to further heat the battery and to generate heat for the passenger compartment. Thus, there is no flow through the condenser arranged in the first cooling circuit either. Thus, the first switching point closes the flow to the condenser so that a maximum of 5% of the volume flow can still pass through, and the second switching point opens completely or opens almost completely. The third switching point controls the flow to the chiller so that up to 30%, in particular more than 5% and less than 30%, of the volume flow is routed through the chiller. The fourth switching point closes the flow to the radiator so that a maximum of 5% of the volume flow can still pass through.

In a further operating method, the operation of the motor vehicle at ambient temperatures between 10° C. and 25° C. is covered. The temperature $T_2$ in the second component to be temperature-controlled, preferably the battery, is in a range of from 10° C. to 25° C. The battery is not yet operating in an optimal thermal range. Therefore, the heat discharged from the first component to be temperature-controlled, in particular from the electric drive motor and power electronics, is used to heat up the battery. However, the battery itself discharges heat to the coolant circuit via the chiller, which heat is used to heat up the passenger compartment. An evaporator advantageously arranged in the coolant circuit is also in operation. The evaporator can thus cool air flowing into the passenger compartment. After cooling, the air is then warmed up again in a heat pump heater or other heating device. This is also called reheat mode and is used to dry the incoming air when the ambient air is very humid. Humidity is separated from the air by cooling the air in the evaporator. In this way, fogging of the windows can be avoided, especially at ambient temperatures below 20° C. and high humidity. Due to the operation of the evaporator, there is also a cooling requirement at the condenser, which means that it is integrated into the first cooling circuit. However, the radiator is still largely not in operation, which means that the heat introduced via the condenser can in turn be used to heat up the battery. The first switching point thus controls the flow in such a way that up to 50%, in particular more than 5% and less than 50%, of the volume flow reaches the condenser. The second switching point opens completely or almost completely. The third switching point controls the flow to the chiller in such a way that up to 50%, in particular more than 5% and less than 50%, of the volume flow is routed through the chiller. The fourth switching point closes the flow to the radiator so that a maximum of 5% of the volume flow can pass through.

In a further operating method, the operation of the motor vehicle at ambient temperatures between 25° C. and 35° C. is covered. The temperature $T_2$ in the second component to be temperature-controlled, preferably the battery, is in a range of from 25° C. to 35° C. The battery has not yet reached its optimum operating temperature but the passenger compartment needs to be cooled. The two cooling circuits are connected to each other. Thus, the first component to be temperature-controlled still heats the battery. However, the chiller no longer discharges heat into the coolant circuit, since there is no longer any need for heat to heat the passenger compartment, and a cooling effect from the chiller on the cooling circuit is not desired. The condenser is integrated into the cooling circuit since the evaporator is active in the coolant circuit to cool the interior, and thus heat builds up in the condenser. The first switching point thus controls the flow in such a way that up to 50%, in particular more than 5% and less than 50%, of the volume flow reaches the condenser. The second switching point opens completely or almost completely. The third switching point closes the flow to the chiller such that a maximum of 5% of the volume flow can still pass through. The fourth switching point likewise closes the flow to the radiator such that a maximum of 5% of the volume flow can still pass through.

In a further operating method, the operation of the motor vehicle at ambient temperatures between 10° C. and 45° C. is covered. The temperature $T_2$ in the second component to be temperature-controlled, preferably the battery, is in a range of from 35° C. to 45° C. The battery has reached the optimum temperature range for operation. The two cooling circuits are connected to each other and the chiller is active. An additional cooling requirement arises at the condenser either due to a reheat operation of the evaporator or due to a pure cooling operation of the evaporator in the coolant circuit. For this purpose, the radiator is then partly integrated in order to discharge excess heat from the cooling circuits to the environment. The first switching point thus controls the flow in such a way that up to 50%, in particular more than 5% and less than 50%, of the volume flow reaches the condenser. The second switching point closes completely or almost completely. The third switching point controls the flow to the chiller in such a way that up to 50%, in particular more than 5% and less than 50%, of the volume flow is routed through the chiller. The forth switching point controls the flow to the radiator in such a way that up to 50%, in particular more than 5% and less than 50%, of the volume flow is routed through the radiator.

Further advantageous embodiments of the invention are described by the following descriptions of the figures. In the figures:

FIG. 1 shows a cooling system 1 according to the invention for a motor vehicle 2 in schematic form. It consists of a first cooling circuit K1, a second cooling circuit K2, and a coolant circuit K3. The cooling system 1 is located in a motor vehicle 2 and controls the temperature of all important components P1, P2, P3, P4 to be temperature-controlled, such as the drive motor, power electronics, battery, or also electronic control devices or computing units for implementing autonomous driving functions. There is a first component P1 to be temperature-controlled in the first cooling circuit K1, wherein at least one further component P3 could also be arranged therein. The first cooling circuit K1 also includes a first coolant pump 3 and a radiator 11. In the effective range of the radiator 11, there is also a fan 12 which, if necessary, can extract or blow ambient air L1 through the radiator 11 and thus has a cooling effect. The coolant pump 3 is used to convey the coolant through the first cooling circuit K1. An indirect condenser 5 is also arranged in the first cooling circuit K1.

Figure 1:
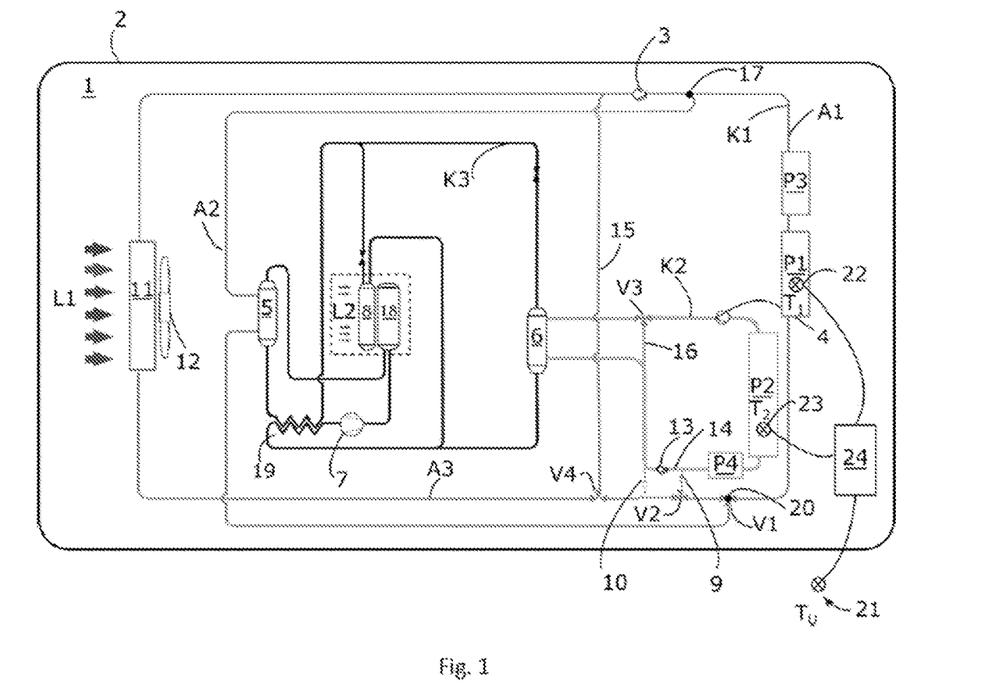
FIG. 1 shows a cooling system according to the invention for a motor vehicle at a glance

The first component P1 to be temperature-controlled and the indirect condenser 5 are arranged in two sections A1, A2 extending parallel to one another, wherein the sections A1, A2 are divided at a first branching point 17 and brought together at a second branching point 20. In FIG. 1, the first switching point V1 is arranged at the second branching point 20, which enables the cooling medium circulating in the first cooling circuit K1 to be divided between the two sections A1, A2. However, it is also conceivable to arrange this first switching point V1 at the first branching point. In this way, cooling medium can be routed as required into the first and third components P1, P3 to be temperature-controlled and/or into the indirect condenser 5. In this case, the distribution ratio is dependent on the operating conditions currently prevailing in the motor vehicle 2. The cooling medium is used in the indirect condenser 5 to dissipate heat from the cooling circuit K3. This becomes necessary when the cooling circuit K3 is used for cooling the passenger compartment or for cooling the at least second component P2, which is advantageously a battery for storing the energy for driving the motor vehicle 2.

Thus, at cold ambient temperatures $T_U$ or when the vehicle 2 is started, there is usually no flow through the indirect condenser 5, but rather the cooling medium is only routed through the first component P1 to be temperature-controlled. This leads to heating of the cooling medium. In the cooling system 1 and operating point shown in FIG. 1, a partial flow of the cooling medium flows through both the indirect condenser 5 and the first section A1.

The second cooling circuit K2 contains at least one second coolant pump 4, which can convey the cooling medium in a suitable manner in the second cooling circuit K2. Like the first cooling circuit K1, the second cooling circuit K2 also contains at least one first component P2 to be temperature-controlled. In a preferred manner according to the invention, this is a battery for storing electrical energy for driving motor vehicle 2. Another component P4 to be temperature-controlled is arranged In FIG. 1 such as an electronic unit for controlling driver assistance systems and/or other electronic components. A heat exchanger designed as a chiller 6 is also arranged in the second cooling circuit.

The first cooling circuit K1 and the second cooling circuit K2 can be connected by means of a first connecting section 9 and a second connecting section 10. A second switching point V2 is arranged in the first connecting section 9. However, the second switching point V2 could also be arranged in the second connecting section 10. The second switching point V2 makes it possible to connect the first connecting section 9 in such a way that a cooling medium circulating in the first cooling circuit K1 flows through the first connecting section 9 completely or at least partially. In this case, the first connecting section 9 is arranged downstream of the at least first component P1 to be temperature-controlled in the first cooling circuit K1, and the second connecting section 9 is arranged downstream of the first connecting section 10. The two connecting sections 9, 10 are connected to one another with a third connecting section 14, wherein the third connecting section 14 has a check valve 15. The check valve 15 allows flow through the third connecting section 14 in only one direction and blocks flow in the other direction. Thus, when the second switching point V2 is closed, the cooling medium in the second cooling circuit K2 circulates in the third connecting section 14 via the check valve 13. If the second switching point V2 is open, the cooling medium circulates coming from the first cooling circuit K1 through the first connecting section 9 and, due to the check valve 13, cannot flow through the third connecting section 14 and thus circulates once in the second cooling circuit K2 and exits it, through the second connecting section 10, back into the first cooling circuit K1.

The radiator 11 arranged in the first cooling circuit K1 is arranged downstream of the second connecting section 10. A third section A3 of the first cooling circuit K1, in which a fourth switching point V4 is arranged, is located downstream of the second connecting section 10 and upstream of the radiator 11. A first bypass section 15, which can be switched by the fourth switching point V4, connects the third section A3 to the area upstream of the first branching point 17.

This fourth switching point V4 connects the third section A3 to the area upstream of the first branching point 17 so that a cooling medium circulating in the first cooling circuit K1 flows through the first bypass section 15 completely or at least partially. In this way, the radiator 11 can be completely or partially bypassed and the cooling capacity of the first cooling circuit K1 can thus be regulated by the ambient air L1. If a lot of heat has to be dissipated from the first cooling circuit K2, the flow can be routed through the radiator 11 in a targeted manner in order to dissipate excess heat from the cooling system 1. By interconnecting the first and second cooling circuits K1, K2, heat can also be dissipated from the second cooling circuit K2 directly via the ambient air L1 if required. In FIG. 1, the fourth switching point V4 is switched in such a way that a partial flow is routed over the radiator 11 and through the first bypass section 15. In the second cooling circuit K2, a third switching point V3 is arranged upstream of the chiller 6, which switching point connects a second bypass section 16 while at least partially bypassing the chiller 6 in such a way that a cooling medium circulating in the second cooling circuit K2 flows through the second bypass section 16 completely or at least partially. The flow of cooling medium through the chiller 6 can thus be controlled and the heat transfer between the second cooling circuit K1 and the coolant circuit K3 can thus be regulated. In FIG. 1, the third switching point V3 is controlled in such a way that a partial flow is routed both through the chiller 6 and through the bypass section 16. The chiller 6 absorbs heat from the second cooling circuit K2 by evaporating the coolant. The second cooling circuit K2 can thus be cooled in a targeted manner as a function of the ambient and operating conditions, which is advantageous for cooling the battery.

The coolant circuit K3 arranged in the cooling system 1 contains a compressor 7. This compressor 7 is preferably electrically driven. In addition, at least one heat exchanger designed as an evaporator 8 is arranged in the coolant circuit K3, which evaporator can exchange heat between the coolant circuit K3 and the air L2 flowing into the passenger compartment. Thus, the air L2 flowing into the passenger compartment can be cooled by evaporating coolant, thus enabling temperature control of the passenger compartment at high outside temperatures $T_U$. However, a reheat function to dry incoming moist air L2 is also possible. In this case, the air L2 is first cooled so that atmospheric moisture is removed and then heated up again with a subsequent heater, e.g. a heat pump heater 18. This heat pump heater 18 allows heat to be exchanged between the coolant circuit K3 and the air L2 flowing into the passenger compartment. Thus, air L2 flowing into the passenger compartment is heated by condensing the coolant in the heat pump heater 18.

The previously described indirect condenser 5 is likewise part of the coolant circuit K3 and enables the heat exchange between the first cooling circuit K1 and the coolant circuit K3. The chiller 6, which is arranged in the second cooling circuit K2 and has already been described, is also part of the coolant circuit K3 and thus enables the heat exchange between the second cooling circuit K2 and the coolant circuit K3. An internal heat exchanger 19 is used to transfer heat and can transfer heat from different areas of the coolant circuit K3. The efficiency of the coolant circuit K3 can thus be increased. The individual components of the cooling circuits K1, K2 and the coolant circuit K3 are fluidly connected to one another by suitable hose or pipe connections.

The cooling system 1 also contains temperature sensors 21, 22, 23 for detecting the ambient temperature $T_U$ and temperatures $T_1$ and $T_2$ at the components P1, P2 to be temperature-controlled. Temperature sensor 21 for measuring the ambient temperature $T_U$ is attached to the motor vehicle 2 at a suitable point, so that the ambient temperature $T_U$ can be detected without direct solar radiation or other directly acting heat sources.

Temperature sensor 22 is located in the coolant flow at the inlet to the first component P1 to be temperature-controlled. If other components to be temperature-controlled, such as the third component P3 to be temperature-controlled, are arranged upstream of the first component P1 to be temperature-controlled, then temperature sensor 22 is located in the coolant flow at the inlet of the components to be temperature-controlled that are located furthest upstream. Temperature sensor 23 is located in the second component P2 to be temperature-controlled, in thermally conductive contact with the material of the component P2. The position of temperature sensor 23 is to be selected in such a way that the measured temperature $T_2$ corresponds to the maximum material temperature occurring in the second component P2 to be temperature-controlled. In the preferred embodiment according to the invention, it is the maximum cell temperature of the battery. The temperature sensors forward the measured signals to a suitable control unit 24, which carries out the necessary switching of the switching points V1, V2, V3, V4 in the cooling system 1, e.g. directly or via another vehicle control unit 26 of the motor vehicle 2.

Figure 2:
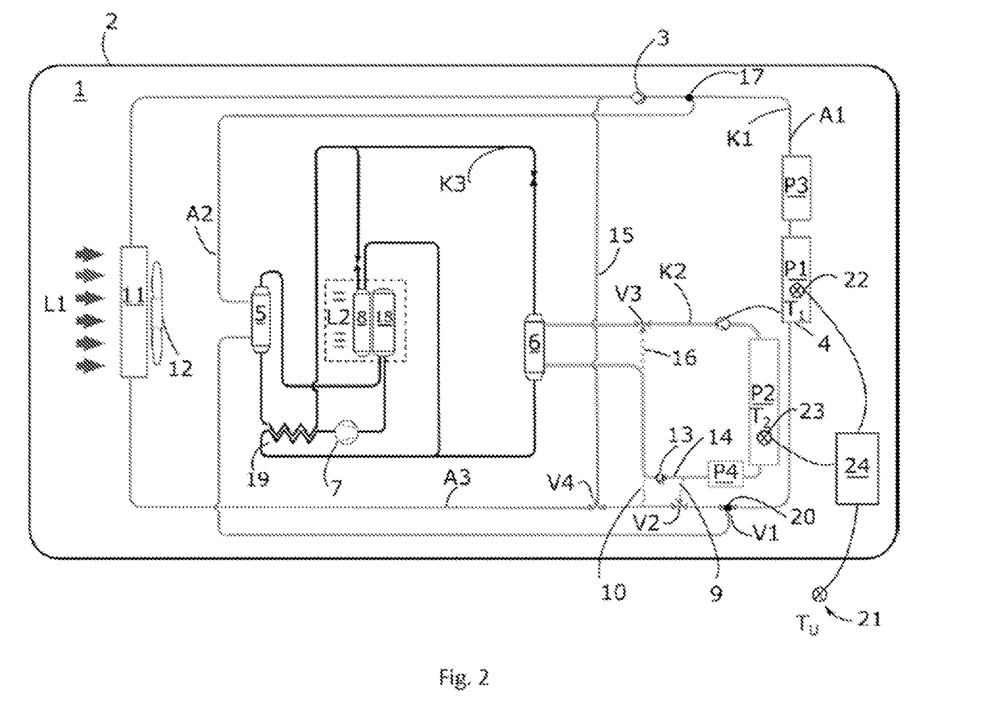
FIG. 2 shows a further cooling system according to the invention for a motor vehicle at a glance

FIG. 2 shows the cooling system 1 according to the invention at a specific operating point. In contrast to the operating point shown in FIG. 1, the cooling medium here flows completely or predominantly through the chiller 6 in the second cooling circuit K2. The third switching point V3 is set in such a way that most of the cooling medium goes through the chiller 6. The two cooling circuits K1 and K2 are separate. The second switching point V2 is switched in such a way that there is no flow through the first connecting section 9. The first and second cooling circuits K1, K2 are therefore not connected to one another. In the second cooling circuit K2, the cooling medium circulates over the third connecting section 14 and the check valve 13 as well as through the components P2, P4 to be temperature-controlled and the chiller 6.

Figure 3:
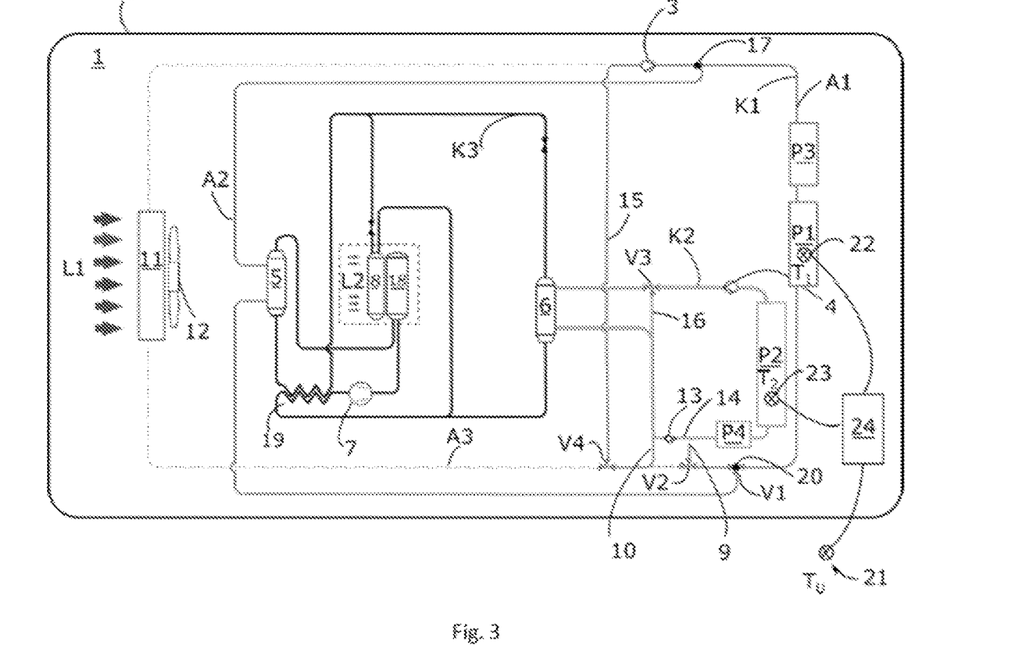
FIG. 3 shows a further cooling system according to the invention for a motor vehicle at a glance, wherein the two cooling circuits are coupled and the radiator is bypassed

FIG. 3 shows the cooling system 1 according to the invention at a further operating point, wherein the first and second cooling circuits K1, K2 are connected to one another here. The cooling medium can thus flow from the first cooling circuit K1 into the second cooling circuit K2 and from there into the components P2, P4 to be temperature-controlled and then through the chiller 6 in a first partial flow and through the second bypass section 16 and then again from the second cooling circuit K2 into the first cooling circuit K1 in a second partial flow. The fourth switching point has closed the flow to the radiator 11 so that there is no flow through it and the cooling medium is routed via the first bypass section 15. A closed flow means that only a volume flow of less than 5% is permitted, which flows through the radiator 11 as permitted leakage. The indirect condenser 5 and the first component P1 to be temperature-controlled are each controlled by the first switching point V1 with partial flows flowing through.

Figure 4:
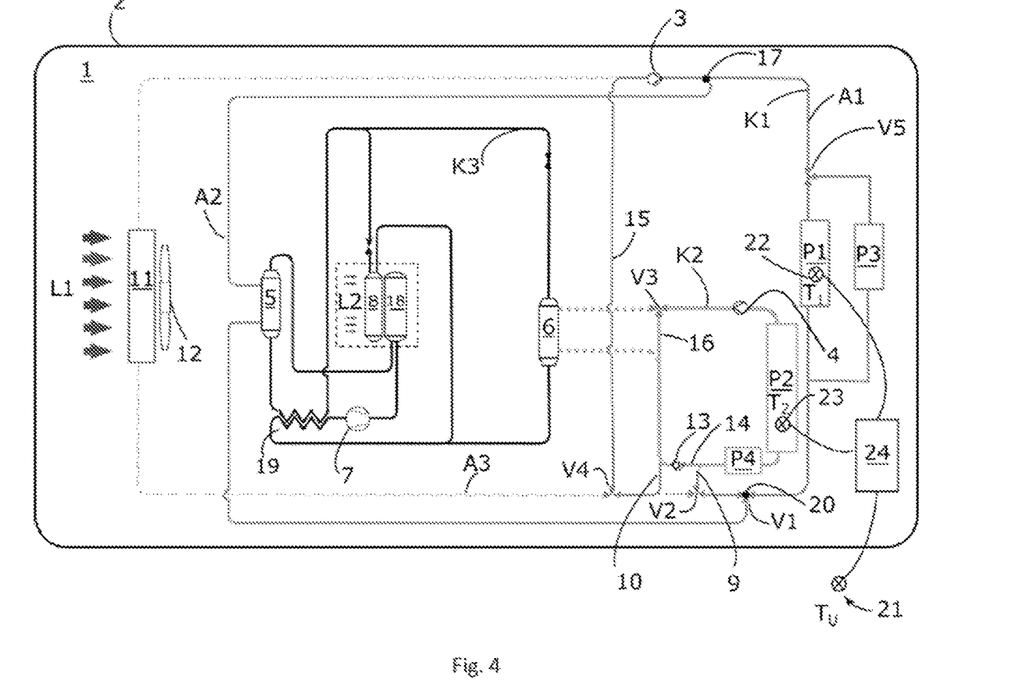
FIG. 4 shows a further cooling system according to the invention for a motor vehicle at a glance, wherein the two cooling circuits are coupled and the radiator and the chiller are bypassed

FIG. 4 shows the cooling system 1 according to the invention at a further operating point. The first and second cooling circuits K1, K2 are also connected to one another here. There is no flow through the radiator 11, but rather the cooling medium is routed through the first bypass section 15. The fourth switching point V4 is switched accordingly. There is then no more flow through the chiller 6. Heat can then no longer be exchanged between the second cooling circuit K2 and the coolant circuit K3. The first component P1 to be temperature-controlled and the third component P3 to be temperature-controlled are then arranged parallel to one another. A fifth switching point V5, which is arranged at a branch to the parallel strands, enables the two components P1, P3 to be temperature-controlled to be selectively integrated into the first cooling circuit K1. It would thus be possible to divide the volume flow of the cooling medium again into the two components P1, P3 to be temperature-controlled, according to a specific distribution ratio. In this way, an increased cooling requirement of an individual component P1, P3 to be temperature-controlled can be taken into account or, for example, one of the components P1, P3 can be completely excluded from cooling if there is no cooling requirement. This reduces the flow resistance in the cooling circuit K1 and can therefore also increase efficiency.

Figure 5:
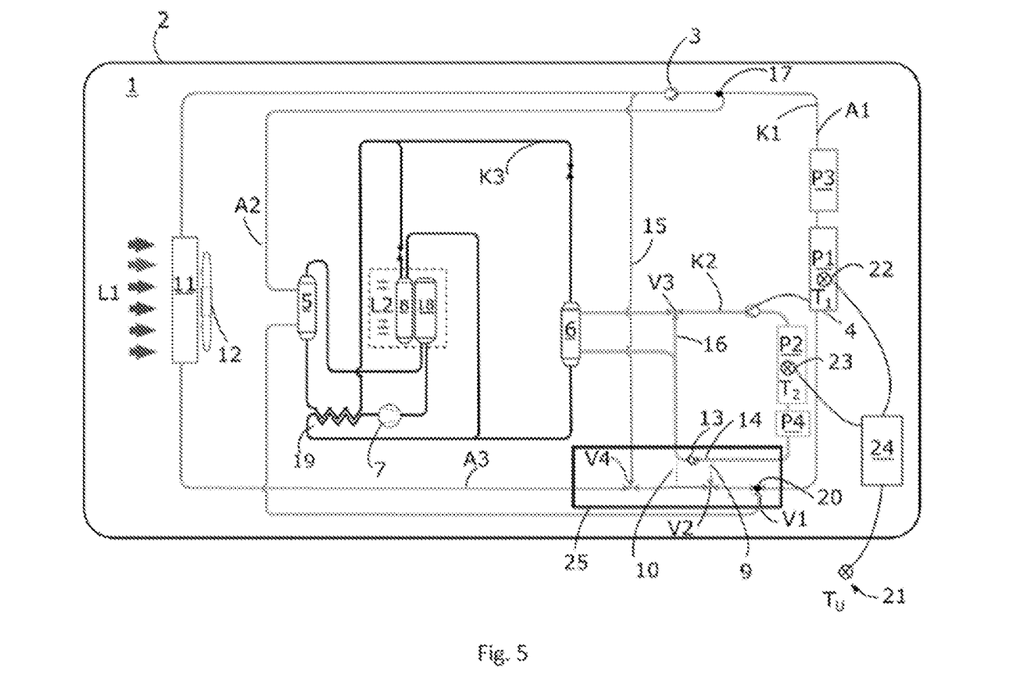
FIG. 5 shows a further cooling system according to the invention for a motor vehicle at a glance, wherein some switching points are combined in a module

FIG. 5 shows a further cooling system according to the invention, wherein several switching points V1, V2, V4 as well as the check valve 12 and the connecting sections 9, 10, 14 are combined in a liquid management module 25 in this case. This means that the control functions of the individual switching points V1, V2, V4 are implemented in a single control valve or in several individual components arranged next to one another in a liquid management module 25, in particular 3/2-way valves or other controllable valves. The connecting sections 9, 10, 14 are also integrated into the liquid management module 25 and could be constructively injected, for example in the load-bearing elements of the liquid management module 25, or fixed directly to the liquid management module 25 as fixed hoses or pipe connections. The check valve 13 can also be structurally integrated into the liquid management module, for example by means of an inserted component. The idea of a liquid management module 25 as an integrating component can be taken even further and supplemented, for example, by incorporating the coolant pumps 3, 4 or the chiller 6 or by further switching points and sensor elements. The interconnection and operating points described here are not influenced by the structural design but only represent further possible exemplary embodiments of the invention.

Figure 6:
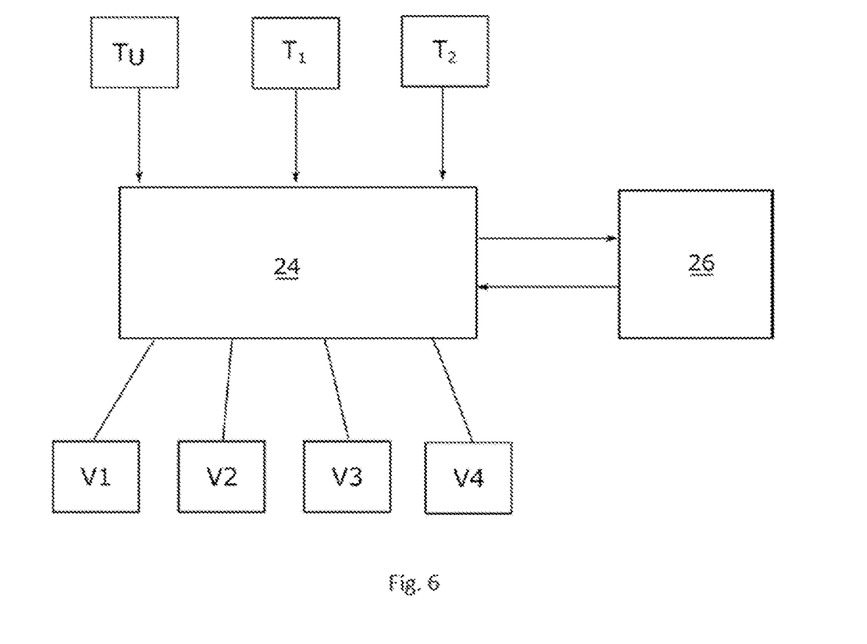
FIG. 6 is a schematic representation of the control logic of the cooling system Preferred embodiment of the invention

FIG. 6 shows a schematic representation of the control logic of the cooling system 1 with which the method for operating the cooling system 1 of the motor vehicle 2 is carried out. The temperatures are shown as necessary input variables $T_U$, $T_1$, $T_2$. The control unit 24 processes this input data and sends corresponding control commands to the control points V1, V2, V3, V4. A vehicle control unit 26 could serve as an additional data source or control aid, e.g. to incorporate other parameters of the motor vehicle 2 into the control of the cooling system 1. For example, a control logic could also advantageously influence the cooling system 1 in anticipation of a hill climb, which is recognized by navigation data, or also incorporate other operating parameters of the motor vehicle. The exact structure of the electronic control logic 24, 26 is not shown hereby. It is also conceivable to use several control devices that communicate with one another or to process all the data centrally and then to distribute the corresponding control commands via a bus system. The constructive and electrical design of this control can therefore not be presented here conclusively.

The application can be best understood with reference to the following Numbered Paragraphs:

Numbered Paragraph 1: A method for operating a cooling system (1) for a motor vehicle (2), in particular for an electrically powered motor vehicle, wherein the cooling system has a first cooling circuit (K1), a second cooling circuit (K2), and at least one coolant circuit (K3);

wherein the first cooling circuit (K1) uses at least one first component (P1) to be temperature-controlled and an indirect condenser (5), which are arranged in two sections (A1, A2) extending parallel to one another, with a first switching point (V1) which is arranged on the first or second branching point (17, 20) and which controls the inflow of a cooling medium into the first component (P1) to be temperature-controlled and the indirect condenser (5);

wherein the second cooling circuit (K2) uses at least one second component (P2) to be temperature-controlled and a chiller (6);

wherein the first and second cooling circuits (K1, K2) are connected by means of a first and second connecting section (9, 10), and a second switching point (V2), which controls the inflow of the cooling medium into at least the first connecting section (9), is arranged at least on the first connecting section (9);

wherein a third switching point (V3), which controls the inflow of cooling medium into the chiller (6), is arranged in the second cooling circuit (K2);

wherein, in the first cooling circuit (K1), a radiator (11) is arranged downstream of the second connecting section (10), and a fourth switching point (V4), which controls the inflow of cooling medium into the radiator (11), is arranged upstream of the radiator (11);

characterized in that
the first, second, third, and fourth switching point (V1, V2, V3, V4) are controlled at least as a function of an ambient temperature TU.

Numbered Paragraph 2: The method according to Numbered Paragraph 1, characterized in that the first, second, third, and fourth switching point (V1, V2, V3, V4) are controlled as a function of a temperature $T_1$, $T_2$ of the first and/or second component (P1, P2) to be temperature-controlled.

Numbered Paragraph 3: The method according to Numbered Paragraph 2, characterized in that, at an ambient temperature $T_U$ of less than −5° C. and a temperature $T_2$ of less than −5° C. in the second component (P2) to be temperature-controlled, the first switching point (V1) closes the flow to the condenser (5), and the second switching point (V2) opens completely or almost completely, and the third switching point (V3) closes the flow to the chiller (6), and the fourth switching point (V4) closes the flow to the radiator (11).

Numbered Paragraph 4: The method according to Numbered Paragraph 2, characterized in that, at the ambient temperature $T_U$ of less than −5° C. and the temperature $T_2$ between −5° C. and 10° C. in the second component (P2) to be temperature-controlled, the first switching point (V1) closes the flow to the condenser (5), and the second switching point (V2) opens completely or almost completely, and the third switching point (V3) controls the flow to the chiller (6) in such a way that up to 30%, in particular more than 5% and up to 30%, of the volume flow is routed through the chiller (6), and the fourth switching point (V4) closes the flow to the radiator (11).

Numbered Paragraph 5: The method according to Numbered Paragraph 2, characterized in that, at the ambient temperature $T_U$ of less than 10° C. and the temperature $T_2$ between 35° C. and 45° C. in the second component (P2) to be temperature-controlled, the first switching point (V1) closes the flow to the condenser (5), and the second switching point (V2) closes, and the third switching point (V3) controls the flow to the chiller (6) in such a way that between 50% and 100% of the volume flow is routed through the chiller (6), and the fourth switching point (V4) closes the flow to the radiator (11).

Numbered Paragraph 6: The method according to Numbered Paragraph 2, characterized in that, at the ambient temperature $T_U$ of less than 10° C. and the temperature $T_2$ between 35° C. and 45° C. in the second component (P2) to be temperature-controlled, and the temperature $T_1$ of more than 50° C. in the first component (P1) to be temperature-controlled, the first switching point (V1) controls the flow in such a way that up to 25%, in particular more than 5% and less than 25%, of the volume flow reaches the condenser (5), and the second switching point (V2) closes, and the third switching point (V3) controls the flow to the chiller (6) in such a way that between 50% and 100% of the volume flow is routed through the chiller (6), and the fourth switching point (V4) controls the flow to the radiator (11) in such a way that up to 30%, in particular more than 5% and less than 30%, of the volume flow is routed through the radiator (11).

Numbered Paragraph 7: The method according to Numbered Paragraph 2, characterized in that, at the ambient temperature $T_U$ between −5° C. and 10° C. and the temperature $T_2$ between −5° C. and 10° C. in the second component (P2) to be temperature-controlled, the first switching point (V1) closes the flow to the condenser (5), and the second switching point (V2) opens completely or almost completely, and the third switching point (V3) controls the flow to the chiller (6) in such a way that up to 30%, in particular more than 5% and less than 30%, of the volume flow is routed through the chiller (6), and the fourth switching point (V4) closes the flow to the radiator (11).

Numbered Paragraph 8: The method according to Numbered Paragraph 2, characterized in that, at the ambient temperature $T_U$ between 10° C. and 25° C. and the temperature $T_2$ between 10° C. and 25° C. in the second component (P2) to be temperature-controlled, the first switching point (V1) controls the flow to the condenser (5) up to 50%, in particular more than 5% and less than 50%, and the second switching point (V2) opens completely or almost completely, and the third switching point (V3) controls the flow to the chiller (6) in such a way that up to 50%, in particular more than 5% and less than 50%, of the volume flow is routed through the chiller (6), and the fourth switching point (V4) closes the flow to the radiator (11).

Numbered Paragraph 9: The method according to Numbered Paragraph 2, characterized in that, at the ambient temperature $T_U$ between 25° C. and 35° C. and the temperature $T_2$ between 25° C. and 35° C. in the second component (P2) to be temperature-controlled, the first switching point (V1) controls the flow in such a way that up to 50%, in particular more than 5% and less than 50%, of the volume flow reaches the condenser (5), and the second switching point (V2) opens completely or almost completely, and the third switching point (V3) closes the flow to the chiller (6) completely or almost completely, and the fourth switching point (V4) closes the flow to the radiator (11).

Numbered Paragraph 10: The method according to Numbered Paragraph 2, characterized in that, at the ambient temperature $T_U$ between 10° C. and 45° C. and the temperature $T_2$ between 35° C. and 45° C. in the second component (P2) to be temperature-controlled, the first switching point (V1) controls the flow in such a way that up to 50%, in particular more than 5% and less than 50%, reaches the condenser (5), and the second switching point (V2) closes completely or almost completely, and the third switching point (V3) controls the flow to the chiller (6) in such a way that up to 50%, in particular more than 5% and less than 50%, of the volume flow reaches the chiller (6), and the fourth switching point (V4) controls the flow to the radiator (11) in such a way that up to 50%, in particular more than 5% and less than 50%, of the volume flow is routed through the radiator (11).

Numbered Paragraph 11: The method according to any one of the preceding Numbered Paragraphs, characterized in that the at least first component (P1) to be temperature-controlled in the first cooling circuit (K1) is an electric drive motor and in that the at least second component (P2) to be temperature-controlled in the second cooling circuit (K2) is a battery for storing electrical energy for driving the motor vehicle (1).

LIST OF REFERENCE SIGNS

1 Cooling system
2 Motor vehicle
3 First coolant pump
4 Second coolant pump
5 Indirect condenser
6 Chiller
7 Compressor
8 Evaporator
9 First connection section
10 Second connection section
11 Radiator
12 Fan
13 Check valve
14 Third connection section
15 First bypass section
16 Second bypass section
17 First branching point
18 Heat pump heater
19 Internal heat exchanger
20 Second branching point
21 Ambient temperature sensor
22 First internal temperature sensor
23 Second internal temperature sensor
24 Control unit
25 Liquid management module
26 Vehicle control unit
A1 Section
A2 Section
A3 Section
K1 First cooling circuit
K2 Second cooling circuit
K3 Coolant circuit
P1 First component to be temperature-controlled
P2 Second component to be temperature-controlled
P3 Third component to be temperature-controlled
P4 Fourth component to be temperature-controlled
L1 Ambient air
L2 Air flowing into the passenger compartment
V1 First switching point
V2 Second switching point
V3 Third switching point
V4 Fourth switching point
V5 Fifth switching point
$T_U$ Ambient temperature
$T_1$ Temperature in the first component to be temperature-controlled
$T_2$ Temperature in the second component to be temperature-controlled

The invention claimed is:

1. A method for operating a cooling system for a motor vehicle, in particular for an electrically powered motor vehicle, wherein the cooling system has a first cooling circuit, a second cooling circuit, and at least one coolant circuit;

wherein the first cooling circuit uses at least one first component to be temperature-controlled and an indirect condenser, which are arranged in two sections extending parallel to one another, with a first switching point which is arranged on the first or second branching point and which controls the inflow of a cooling medium into the at least one first component to be temperature-controlled and the indirect condenser;

wherein the second cooling circuit uses at least one second component to be temperature-controlled and a chiller;

wherein the first and second cooling circuits are connected by means of a first and second connecting section, and a second switching point, which controls the inflow of the cooling medium into at least the first connecting section, is arranged at least on the first connecting section;

wherein a third switching point, which controls the inflow of cooling medium into the chiller, is arranged in the second cooling circuit;

wherein, in the first cooling circuit, a radiator is arranged downstream of the second connecting section, and a fourth switching point, which controls the inflow of cooling medium into the radiator, is arranged upstream of the radiator;

wherein the first, second, third, and fourth switching points are controlled at least as a function of an ambient temperature $T_U$;

wherein the first, second, third, and fourth switching points are controlled as a function of a temperature $T_1$, $T_2$ of the at least one first component and/or the at least one second component to be temperature-controlled.

2. The method according to claim 1, wherein at an ambient temperature of less than −5° C. and a temperature $T_2$ of less than −5° C. in the at least one second component to be temperature-controlled, the first switching point closes the flow to the condenser, and the second switching point opens completely or almost completely, and the third switching point closes the flow to the chiller, and the fourth switching point closes the flow to the radiator.

3. The method according to claim 1, wherein at the ambient temperature of less than −5° C. and the temperature $T_2$ between −5° C. and 10° C. in the at least one second component to be temperature-controlled, the first switching point closes the flow to the condenser, and the second switching point opens completely or almost completely, and the third switching point controls the flow to the chiller in such a way that up to 30%, in particular more than 5% and up to 30%, of the volume flow is routed through the chiller, and the fourth switching point closes the flow to the radiator.

4. The method according to claim 1, wherein at the ambient temperature of less than 10° C. and the temperature $T_2$ between 35° C. and 45° C. in the at least one second component to be temperature-controlled, the first switching point closes the flow to the condenser, and the second switching point closes, and the third switching point controls the flow to the chiller in such a way that between 50% and 100% of the volume flow is routed through the chiller, and the fourth switching point closes the flow to the radiator.

5. The method according to claim 1, wherein, at the ambient temperature of less than 10° C. and the temperature $T_2$ between 35° C. and 45° C. in the at least one second component to be temperature-controlled, and the temperature $T_1$ of more than 50° C. in the at least one first component to be temperature-controlled, the first switching point controls the flow in such a way that up to 25%, in particular more than 5% and less than 25%, of the volume flow reaches the condenser, and the second switching point closes, and the third switching point controls the flow to the chiller in such a way that between 50% and 100% of the volume flow is routed through the chiller, and the fourth switching point controls the flow to the radiator in such a way that up to 30%, in particular more than 5% and less than 30%, of the volume flow is routed through the radiator.

6. The method according to claim 1, wherein at the ambient temperature between −5° C. and 10° C. and the temperature $T_2$ between −5° C. and 10° C. in the at least one second component to be temperature-controlled, the first switching point closes the flow to the condenser, and the second switching point opens completely or almost completely, and the third switching point controls the flow to the chiller in such a way that up to 30%, in particular more than 5% and less than 30%, of the volume flow is routed through the chiller, and the fourth switching point closes the flow to the radiator.

7. The method according to claim 1, wherein, at the ambient temperature between 10° C. and 25° C. and the temperature $T_2$ between 10° C. and 25° C. in the at least one second component to be temperature-controlled, the first switching point controls the flow to the condenser up to 50%, in particular more than 5% and less than 50%, and the second switching point opens completely or almost completely, and the third switching point controls the flow to the chiller in such a way that up to 50%, in particular more than 5% and less than 50%, of the volume flow is routed through the chiller, and the fourth switching point closes the flow to the radiator.

8. The method according to claim 1, wherein at the ambient temperature between 25° C. and 35° C. and the temperature $T_2$ between 25° C. and 35° C. in the at least one second component to be temperature-controlled, the first switching point controls the flow in such a way that up to 50%, in particular more than 5% and less than 50%, of the volume flow reaches the condenser, and the second switching point opens completely or almost completely, and the third switching point closes the flow to the chiller completely or almost completely, and the fourth switching point closes the flow to the radiator.

9. The method according to claim 1, wherein at the ambient temperature between 10° C. and 45° C. and the temperature $T_2$ between 35° C. and 45° C. in the at least one second component to be temperature-controlled, the first switching point controls the flow in such a way that up to 50%, in particular more than 5% and less than 50%, reaches the condenser, and the second switching point closes completely or almost completely, and the third switching point controls the flow to the chiller in such a way that up to 50%, in particular more than 5% and less than 50%, of the volume flow reaches the chiller, and the fourth switching point controls the flow to the radiator in such a way that up to 50%, in particular more than 5% and less than 50%, of the volume flow is routed through the radiator.

10. The method according to claim 1, characterized in that the at least one first component to be temperature-controlled in the first cooling circuit is an electric drive motor and in that the at least one second component to be temperature-controlled in the second cooling circuit is a battery for storing electrical energy for driving the motor vehicle.

11. A method for operating a cooling system for a motor vehicle, in particular for an electrically powered motor vehicle, wherein the cooling system has a first cooling circuit, a second cooling circuit, and at least one coolant circuit;

wherein the first cooling circuit uses at least one first component to be temperature-controlled and an indirect condenser, which are arranged in two sections extending parallel to one another, with a first switching point which is arranged on the first or second branching point and which controls the inflow of a cooling medium into the at least one first component to be temperature-controlled and the indirect condenser;

wherein the second cooling circuit uses at least one second component to be temperature-controlled and a chiller;

wherein the first and second cooling circuits are connected by means of a first and second connecting section, and a second switching point, which controls the inflow of the cooling medium into at least the first connecting section, is arranged at least on the first connecting section;

wherein a third switching point, which controls the inflow of cooling medium into the chiller, is arranged in the second cooling circuit;

wherein, in the first cooling circuit, a radiator is arranged downstream of the second connecting section, and a fourth switching point, which controls the inflow of cooling medium into the radiator, is arranged upstream of the radiator;

wherein the first, second, third, and fourth switching points are controlled at least as a function of an ambient temperature $T_U$, wherein the at least one first component to be temperature-controlled in the first cooling circuit is an electric drive motor and in that the at least one second component to be temperature-controlled in the second cooling circuit is a battery for storing electrical energy for driving the motor vehicle.

12. The method according to claim 11, wherein at an ambient temperature of less than $-5°$ C. and a temperature $T_2$ of less than $-5°$ C. in the at least one second component to be temperature-controlled, the first switching point closes the flow to the condenser, and the second switching point opens completely or almost completely, and the third switching point closes the flow to the chiller, and the fourth switching point closes the flow to the radiator.

13. The method according to claim 11, wherein at the ambient temperature of less than $-5°$ C. and the temperature $T_2$ between $-5°$ C. and $10°$ C. in the at least one second component to be temperature-controlled, the first switching point closes the flow to the condenser, and the second switching point opens completely or almost completely, and the third switching point controls the flow to the chiller in such a way that up to 30%, in particular more than 5% and up to 30%, of the volume flow is routed through the chiller, and the fourth switching point closes the flow to the radiator.

14. The method according to claim 11, wherein at the ambient temperature of less than $10°$ C. and the temperature $T_2$ between $35°$ C. and $45°$ C. in the at least one second component to be temperature-controlled, the first switching point closes the flow to the condenser, and the second switching point closes, and the third switching point controls the flow to the chiller in such a way that between 50% and 100% of the volume flow is routed through the chiller, and the fourth switching point closes the flow to the radiator.

15. The method according to claim 11, wherein, at the ambient temperature of less than $10°$ C. and the temperature $T_2$ between $35°$ C. and $45°$ C. in the at least one second component to be temperature-controlled, and the temperature $T_1$ of more than $50°$ C. in the at least one first component to be temperature-controlled, the first switching point controls the flow in such a way that up to 25%, in particular more than 5% and less than 25%, of the volume flow reaches the condenser, and the second switching point closes, and the third switching point controls the flow to the chiller in such a way that between 50% and 100% of the volume flow is routed through the chiller, and the fourth switching point controls the flow to the radiator in such a way that up to 30%, in particular more than 5% and less than 30%, of the volume flow is routed through the radiator.

16. The method according to claim 11, wherein at the ambient temperature between $-5°$ C. and $10°$ C. and the temperature $T_2$ between $-5°$ C. and $10°$ C. in the at least one second component to be temperature-controlled, the first switching point closes the flow to the condenser, and the second switching point opens completely or almost completely, and the third switching point controls the flow to the chiller in such a way that up to 30%, in particular more than 5% and less than 30%, of the volume flow is routed through the chiller, and the fourth switching point closes the flow to the radiator.

17. The method according to claim 11, wherein, at the ambient temperature between $10°$ C. and $25°$ C. and the temperature $T_2$ between $10°$ C. and $25°$ C. in the at least one second component to be temperature-controlled, the first switching point controls the flow to the condenser up to 50%, in particular more than 5% and less than 50%, and the second switching point opens completely or almost completely, and the third switching point controls the flow to the chiller in such a way that up to 50%, in particular more than 5% and less than 50%, of the volume flow is routed through the chiller, and the fourth switching point closes the flow to the radiator.

18. The method according to claim 1, wherein at the ambient temperature between $25°$ C. and $35°$ C. and the temperature $T_2$ between $25°$ C. and $35°$ C. in the at least one second component to be temperature-controlled, the first switching point controls the flow in such a way that up to 50%, in particular more than 5% and less than 50%, of the volume flow reaches the condenser, and the second switching point opens completely or almost completely, and the third switching point closes the flow to the chiller completely or almost completely, and the fourth switching point closes the flow to the radiator.

19. The method according to claim 11, wherein at the ambient temperature between $10°$ C. and $45°$ C. and the temperature $T_2$ between $35°$ C. and $45°$ C. in the at least one second component to be temperature-controlled, the first switching point controls the flow in such a way that up to 50%, in particular more than 5% and less than 50%, reaches the condenser, and the second switching point closes completely or almost completely, and the third switching point controls the flow to the chiller in such a way that up to 50%, in particular more than 5% and less than 50%, of the volume flow reaches the chiller, and the fourth switching point controls the flow to the radiator in such a way that up to 50%, in particular more than 5% and less than 50%, of the volume flow is routed through the radiator.

* * * * *